Feb. 7, 1933.   G. FAVALLI   1,896,296
BRAKE SHOE RELINING DEVICE
Filed Oct. 22, 1931
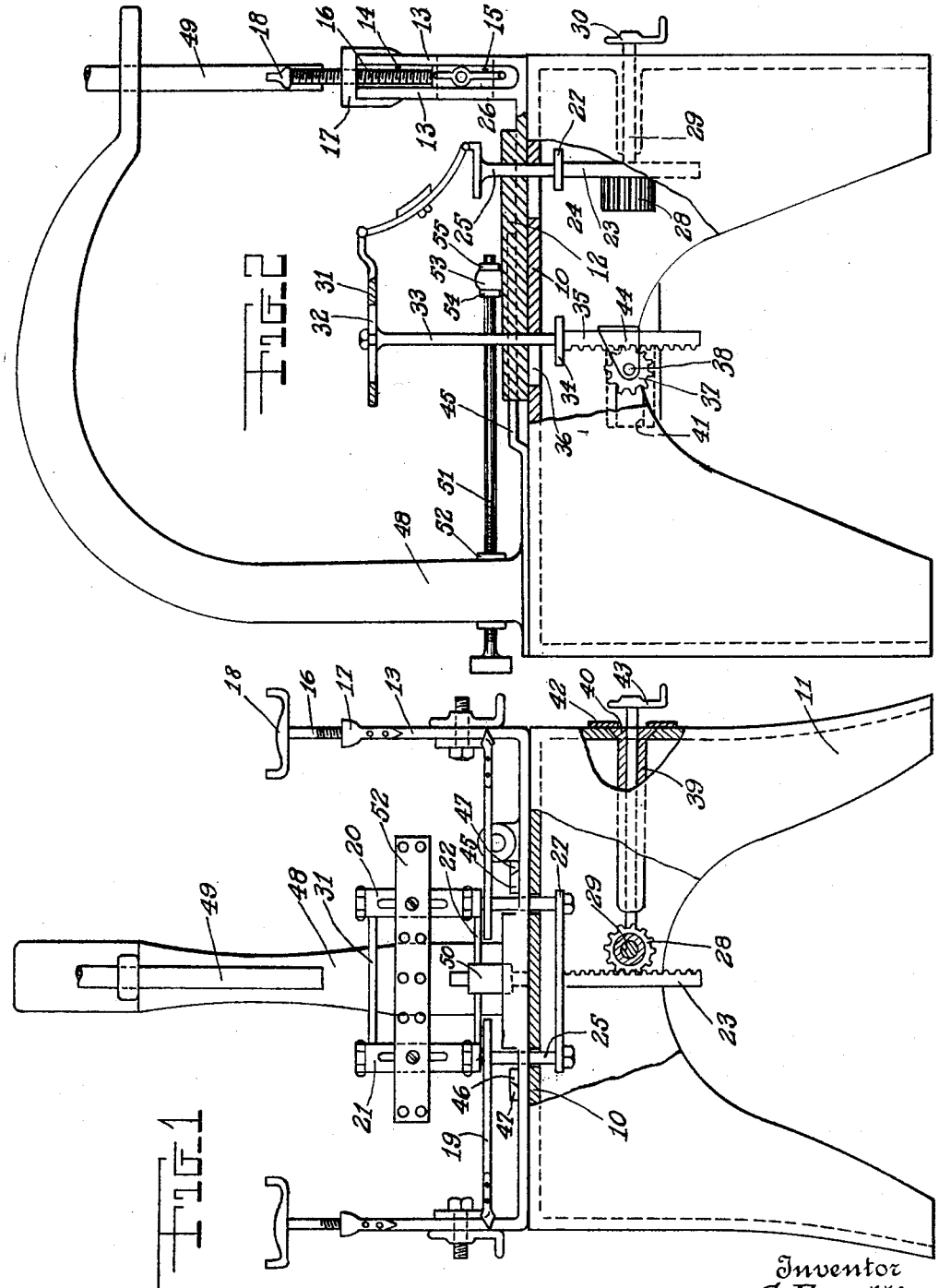
Inventor
G. Favalli
By his Attorney J. Ledermann Patented Feb. 7, 1933

1,896,296

UNITED STATES PATENT OFFICE

GEORGE FAVALLI, OF NEW YORK, N. Y.

BRAKE SHOE RELINING DEVICE

Application filed October 22, 1931. Serial No. 570,358.

The main object of this invention is to provide a device which is adapted to reline a brake shoe for an automobile with precision and dispatch.

Another object of this invention is the provision of a brake shoe relining device upon which the lining securing holes may be spotted and the rivets peened over to anchor the lining to the brake shoe.

The above and other objects will become apparent in the description below in which characters of reference refer to like-named parts in the drawing.

Referring briefly to the drawing, Figure 1 is a partly sectioned front elevational view of the brake shoe relining device showing the means for adjusting the brake shoe carriage.

Figure 2 is a partly sectioned side elevational view of Figure 1.

Referring in detail to the drawing, the numeral 10 indicates a table which is supported on legs 11. This table has a flat upper surface upon which a block 12 is slidably mounted. The forward ends of this block 12 have spaced apart vertical guide rails 13 and the channel 14 between these rails receives a runner 15. A feed screw 16 is rotatably attached to the runner and engages in a cap 17, the latter being mounted securely at the upper end of the rails. The feed screw is surmounted by a manipulating handle 18. The runner 15 has seat plates 19 extending sidewise from the guide rails and serves as a support for the brake shoe as the latter is being worked on. Rearward of these seat plates an adjustable cradle is located. This cradle comprises a pair of straps 20 and 21 which are hinged to a tongue 22. The latter is mounted on a pair of studs 25 which are guided in openings 26 of the block 12. The studs are slidable in slots 24 formed in the table and the studs are mounted on a finger 27. A rack bar 23 depends from the finger and is engaged by a pinion 28. This pinion is mounted on a shaft 29 which is rotated by a crank 30.

The rear ends of the carriage or cradle straps are hingedly connected by ear 31 which is slotted at 32 to permit adjustment of the studs 33 when the cradle is shifted. The studs 33 are mounted on fingers 34 from which a rack bar 35 depends. The studs 33 are slidable in openings in the block 12 and are movable in slots 36 formed in the table 10. The rack bar engages a rack pinion 37 which is mounted on a shaft 38. The latter is mounted in a movable sleeve 39 which is provided with dove-tailed ends 40 which register in a channel 41. The dove-tailed ends of the sleeve are retained in place in the channel by straps 42. The shaft has a crank 43 mounted thereon for rotation of the pinion. The rack bar 35 and pinion 37 are coupled or retained in engagement with each other by a U-shaped bracket 44.

The block 12 is movably mounted on the table 10 and is guided in a straight path by a pair of spaced apart dovetailed arms 45 and 46. Said arms cooperate with guide ridges 47 mounted on the block 12.

At the rear of the table an overslung beam 48 is anchored. The opposite end has a riveting mandrel 49 slidable therein. Member 49 cooperates with a rivet anvil 50 which is removably secured at the forward end of the block 12. On one side of the beam 48 a threaded shaft 51 is rotatably mounted in a boss 52 and is adapted to reciprocate longitudinally when being rotated. The shaft 51 at its end has a pair of spaced-apart collars 54 and 55 secured thereto. Between these collars a lug 53 is located and mounted on the block 12.

The device is adapted to serve as a support, apron or mounting upon which the linings are mounted on the brake shoes. The brake shoe is placed on the adjustable strap 52 in a position complemental to the lining. This strap is mounted on the straps 20 and 21. This entire cradle is mounted movably on the table so that the crade may be adjusted to accommodate different sizes of brake shoes.

It is to be noted that certain changes in form and construction may be made without departing from the spirit and scope of the invention.

I claim:

In a device of the class described, a flat-topped slotted table having a block slidably mounted thereon, said block having vertical holes therethrough, vertical studs passing through the slots in said table and the holes in said block, horizontal brace members joining said studs together both above and below said table top, spaced-apart arcuate straps supported at their lower ends on said upper brace member, additional studs passing through said table and said block, additional brace members joining said additional studs above and below said table top, the upper of said additional brace members supporting the upper ends of said straps, said ends of said straps being hinged to said supporting braces, a brake-shoe receiving band joining said straps and adjustably mounted thereon, and means for shifting the position of said studs.

In testimony whereof I affix my signature.

GEORGE FAVALLI.